United States Patent
Nomura

(10) Patent No.: US 8,824,465 B2
(45) Date of Patent: Sep. 2, 2014

(54) VERIFICATION APPARATUS, METHOD, AND RECORDING MEDIUM OF PROGRAM

(75) Inventor: Yuji Nomura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 104 days.

(21) Appl. No.: 13/214,300

(22) Filed: Aug. 22, 2011

(65) Prior Publication Data

US 2012/0051232 A1    Mar. 1, 2012

(30) Foreign Application Priority Data

Aug. 25, 2010 (JP) ................................. 2010-188771

(51) Int. Cl.
*H04L 12/50* (2006.01)
*H04Q 11/00* (2006.01)
*H04L 12/24* (2006.01)
*H04L 29/06* (2006.01)
*H04L 12/56* (2006.01)
*H04L 29/08* (2006.01)

(52) U.S. Cl.
CPC ................. *H04L 41/12* (2013.01); *H04L 45/24* (2013.01); *H04L 69/14* (2013.01); *H04L 67/1097* (2013.01); *Y02B 60/33* (2013.01)
USPC ............ 370/386; 370/250; 370/357; 370/360

(58) Field of Classification Search
USPC ......... 370/242, 244, 247, 248, 249, 250, 255, 370/357, 360, 363, 368, 371, 374, 378, 370/386; 709/238–244
See application file for complete search history.

(56) References Cited

U.S. PATENT DOCUMENTS

| 8,125,991 | B1* | 2/2012 | Schlansker et al. | ........... 370/392 |
| 2006/0146694 | A1 | 7/2006 | Hamaguchi et al. | |
| 2006/0227779 | A1* | 10/2006 | Shimizu | ........................ 370/389 |
| 2012/0016917 | A1* | 1/2012 | Priddle et al. | .................. 707/827 |
| 2012/0051232 | A1* | 3/2012 | Nomura | ........................ 370/248 |

FOREIGN PATENT DOCUMENTS

| JP | 2003-167794 | 6/2003 |
| JP | 2006-174157 | 6/2006 |
| WO | 2010/000657 | 1/2010 |

OTHER PUBLICATIONS

Office Action of Japanese Patent Application 2010-188771 dated Feb. 4, 2014.

* cited by examiner

*Primary Examiner* — Benjamin H Elliott, IV
(74) *Attorney, Agent, or Firm* — Staas & Halsey LLP

(57) ABSTRACT

A verification device that is used in a system in which a first device and a second device communicate using a physical communication path that includes at least one switch among switches included in a plurality of switch clusters and does not include a plurality of switches that belong to a different switch cluster among the plurality of switch clusters, the verification device including a verification unit that verifies whether switches included in a first communication path and a second communication path that are communication paths used for communication between the first device and the second device are included in the same switch cluster, and an output unit that outputs a result of the verifying.

18 Claims, 12 Drawing Sheets

FIG. 4

| SERVER INFORMATION | SERVER 1 | 41A | HBA INFORMATION | HBA11 |
| --- | --- | --- | --- | --- |
| | | | | HBA12 |
| | | | | ... |
| | | 41B | MULTIPATH 1 INFORMATION | ACCESS PATH 1 |
| | | | | ACCESS PATH 2 |
| | | | | ... |
| | SERVER 2 | 41A | HBA INFORMATION | HBA21 |
| | | | | HBA22 |
| | | | | ... |
| | | 41B | MULTIPATH 2 INFORMATION | ACCESS PATH 3 |
| | | | | ACCESS PATH 4 |
| | | | | ... |
| | | 41C | MULTIPATH 3 INFORMATION | ACCESS PATH 5 |
| | | | | ACCESS PATH 6 |
| | | | | ... |
| | ... | | ... | ... |
| SWITCH INFORMATION | SWITCH 1 | 42A | FABRIC INFORMATION | FabricName1 |
| | | 42B | SWITCH INFORMATION | FabricElementName1 |
| | | 42C | DESTINATION INFORMATION | HBA11 |
| | | | | ... |
| | | | | CA11 |
| | | | | ... |
| | SWITCH 2 | 42A | FABRIC INFORMATION | FabricName1 |
| | | 42B | SWITCH INFORMATION | FabricElementName2 |
| | | 42C | DESTINATION INFORMATION | HBA21 |
| | | | | ... |
| | | | | CA12 |
| | | | | ... |
| | SWITCH 3 | 42A | FABRIC INFORMATION | FabricName2 |
| | | 42B | SWITCH INFORMATION | FabricElementName3 |
| | | 42C | DESTINATION INFORMATION | HBA12 |
| | | | | ... |
| | | | | CA13 |
| | | | | ... |
| | SWITCH 4 | 42A | FABRIC INFORMATION | FabricName2 |
| | | 42B | SWITCH INFORMATION | FabricElementName4 |
| | | 42C | DESTINATION INFORMATION | HBA22 |
| | | | | ... |
| | | | | CA14 |
| | | | | ... |
| | ... | | ... | ... |
| STORAGE INFORMATION | STORAGE 1 | 43A | CA INFORMATION | CA11 |
| | | | | CA12 |
| | | | | ... |
| | STORAGE 2 | 43B | CA INFORMATION | CA21 |
| | | | | CA22 |
| | | | | ... |
| | ... | | ... | ... |
| ACCESS PATH INFORMATION | ACCESS PATH 1 | 44A | CONFIGURATION INFORMATION | HBA11 |
| | | | | CA11 |
| | ACCESS PATH 2 | 44A | CONFIGURATION INFORMATION | HBA12 |
| | | | | CA13 |
| | ACCESS PATH 3 | 44A | CONFIGURATION INFORMATION | HBA21 |
| | | | | CA12 |
| | ACCESS PATH 4 | 44A | CONFIGURATION INFORMATION | HBA22 |
| | | | | CA14 |
| | ... | | ... | ... |

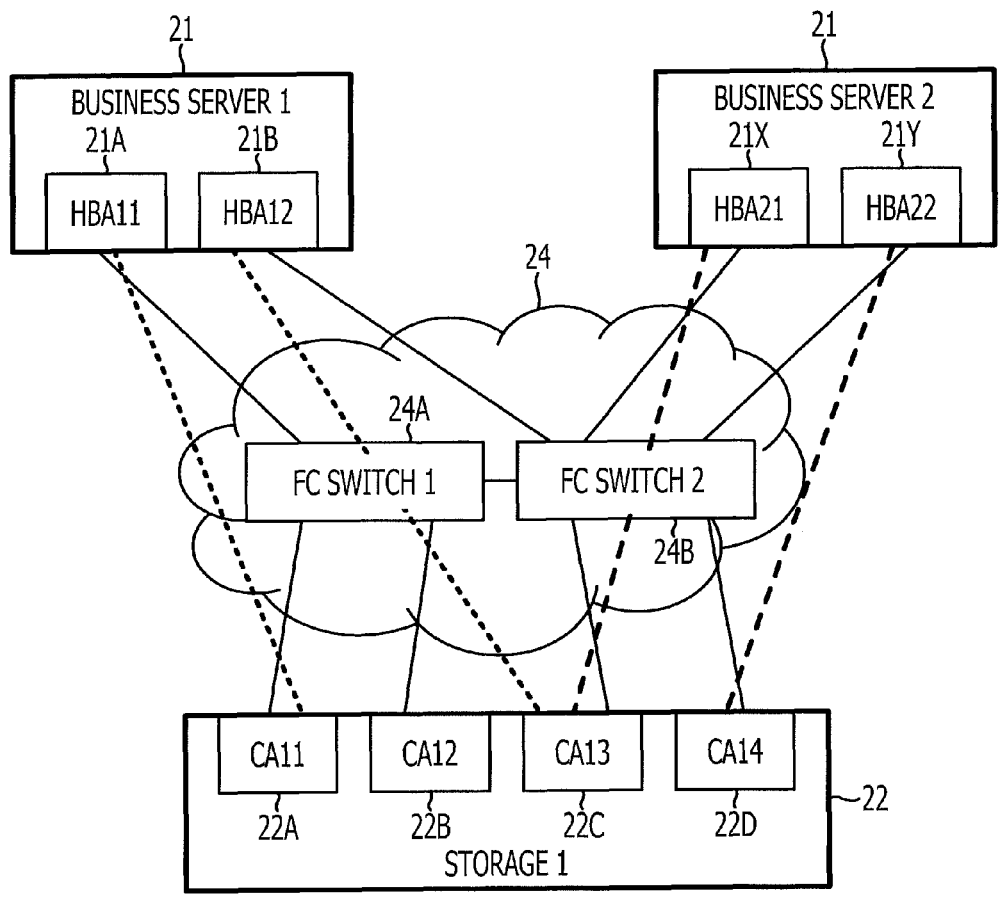

VERIFICATION APPARATUS, METHOD, AND RECORDING MEDIUM OF PROGRAM

CROSS-REFERENCE TO RELATED APPLICATIONS

This application is based upon and claims the benefit of priority of the prior Japanese Patent Application No. 2010-188771, filed on Aug. 25, 2010, the entire contents of which are incorporated herein by reference.

FIELD

The embodiments disclosed herein are related to verification technology.

BACKGROUND

Recently, multiple switches arranged between a server and storage are used to form a plurality of communication paths, e.g., a multipath configuration, between the servers and storage in a storage area network (hereafter abbreviated as "SAN") environment. Redundancy between the server and the storage can be assured by forming a multipath configuration in which the communication paths are completely and physically separated.

To confirm that the communication paths are physically separated, a path searching method exists which searches each of the communication paths in a multipath configuration. For example, known art includes a technique to verify redundancy in physical connections in a network and a technique to diagnose redundancy of access from a server to storage (see for example Japanese Unexamined Patent Application Publication No. 2006-174157 and Japanese Unexamined Patent Application Publication No. 2003-167794).

However, when searching communication paths in a multipath configuration with assured physical redundancy using the path searching method, the amount of calculation increases which in turn increases the processing load required for verifying the communication path when conducting the search in a large-scale network. In this case, a large amount of time is needed for the verification.

SUMMARY

According to an aspect of the invention, a verification device that is used in a system in which a first device and a second device communicate using a physical communication path that includes at least one switch among switches included in a plurality of switch clusters and does not include a plurality of switches that belong to a different switch cluster among the plurality of switch clusters, the verification device including a verification unit that verifies whether switches included in a first communication path and a second communication path that are communication paths used for communication between the first device and the second device are included in the same switch cluster, and an output unit that outputs a result of the verifying.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 illustrates exemplary contents of a SAN management storage unit.

FIG. 5 illustrates an exemplary multipath configuration using a fabric configured with two FC switches.

DESCRIPTION OF EMBODIMENTS

The following is a detailed explanation of embodiments of an evaluation program, a verification device, and a verification method related to the present application with reference to the accompanying drawings. However, the present disclosure is not limited to the embodiments described herein.

Figure 1:
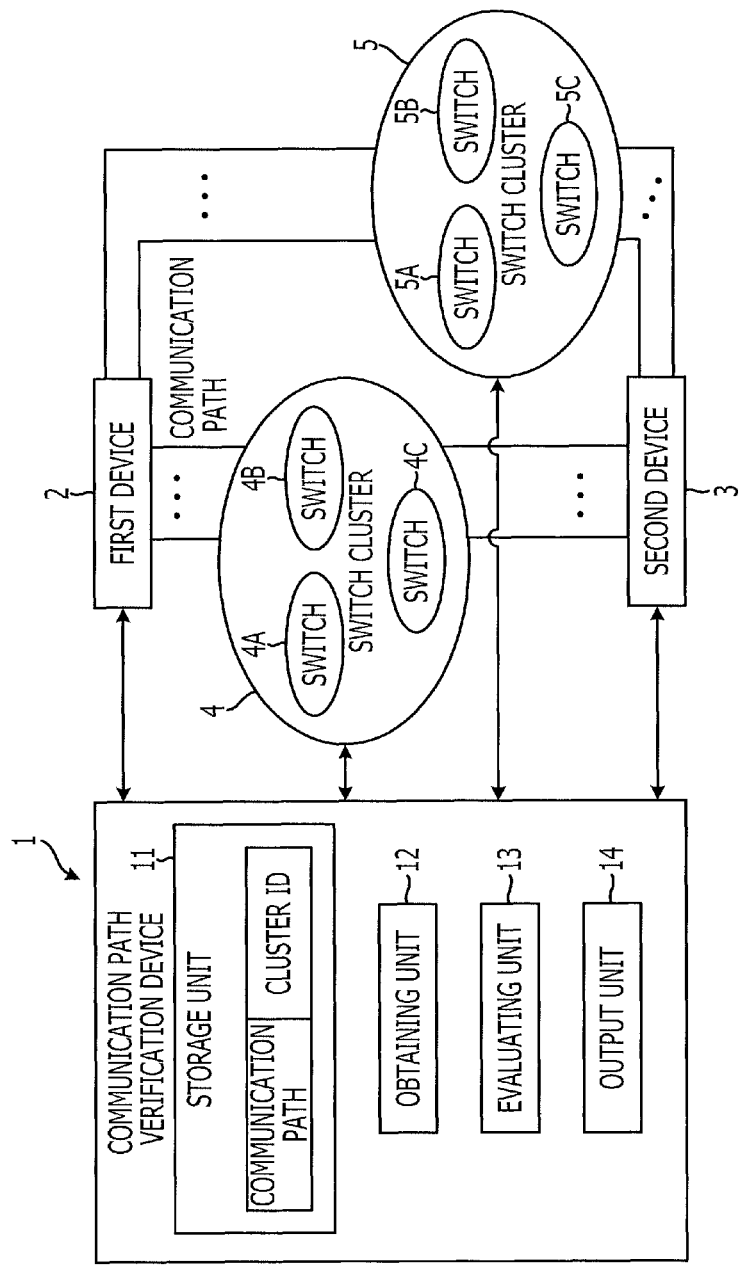
FIG. 1 illustrates the internal configuration of a SAN system according to a first embodiment.

FIG. 1 is a block diagram illustrating a configuration inside a SAN system of a first embodiment. The SAN system illustrated in FIG. 1 includes a communication path verification device 1, a first device 2, a second device 3, a switch cluster 4, and a switch cluster 5.

The switch cluster 4 includes multiple switches (switch 4A, switch 4B, switch 4C), and the switch cluster 5 also includes multiple switches (switch 5A, switch 5B, switch 5C). Each of the switches in the switch cluster 4 may be linked to any of the other switches in the switch cluster 4, the first device 2, and the second device 3, but are not linked to the switches in the switch cluster 5. Similarly, each of the switches in the switch cluster 5 may be linked to any of the other switches in the switch cluster 5, the first device 2, and the second device 3, but are not linked to the switches in the switch cluster 4.

The communication path verification device 1 has a storage unit 11, an obtaining unit 12, a evaluating unit 13, and an output unit 14. The storage unit 11 stores information (cluster ID) that identifies a switch cluster that includes switches used in the applicable communication path, in association with information (path ID) that identifies the communication path between the first device 2 and the second device 3. The obtaining unit 12 obtains the cluster ID stored in the storage unit 11 in association with the path ID of the applicable communication path from the storage unit 11, for each communication path between the first device 2 and the second device 3 when multiple communication paths exist therebetween. The evaluating unit 13 evaluates whether or not the multiple cluster IDs obtained by the obtaining unit 12 are the same or not. The output unit 14 outputs the result of the evaluation by the evaluating unit 13.

Storing the cluster ID in association with the path ID in the storage unit 11 may be conducted, for example, according to the following method. First, an identifier is given to a port that is provided in the first device 2 and that is used for communication with the second device 3. Further, the cluster ID of the switch cluster that includes the switch that includes the port facing and linked to the port that receives the identifier is stored in association with the identifier.

In the first embodiment, when there are multiple communication paths between the first device 2 and the second device 3, the cluster IDs of the switch clusters corresponding to the applicable communication paths are obtained for each communication path between the first device 2 and the second device 3, and an evaluation is conducted to determine whether or not the same cluster IDs of the communication paths were obtained, and then the evaluation result is outputted.

As a result, redundantly arranged communication paths between the first device 2 and the second device 3 can be confirmed without conducting path searching of the multiple communication paths. As a result, the processing load needed for verifying redundancy can be reduced. Moreover, the time needed to conduct such verification can be reduced due to the reduction in the processing load needed for verification.

Figure 2:
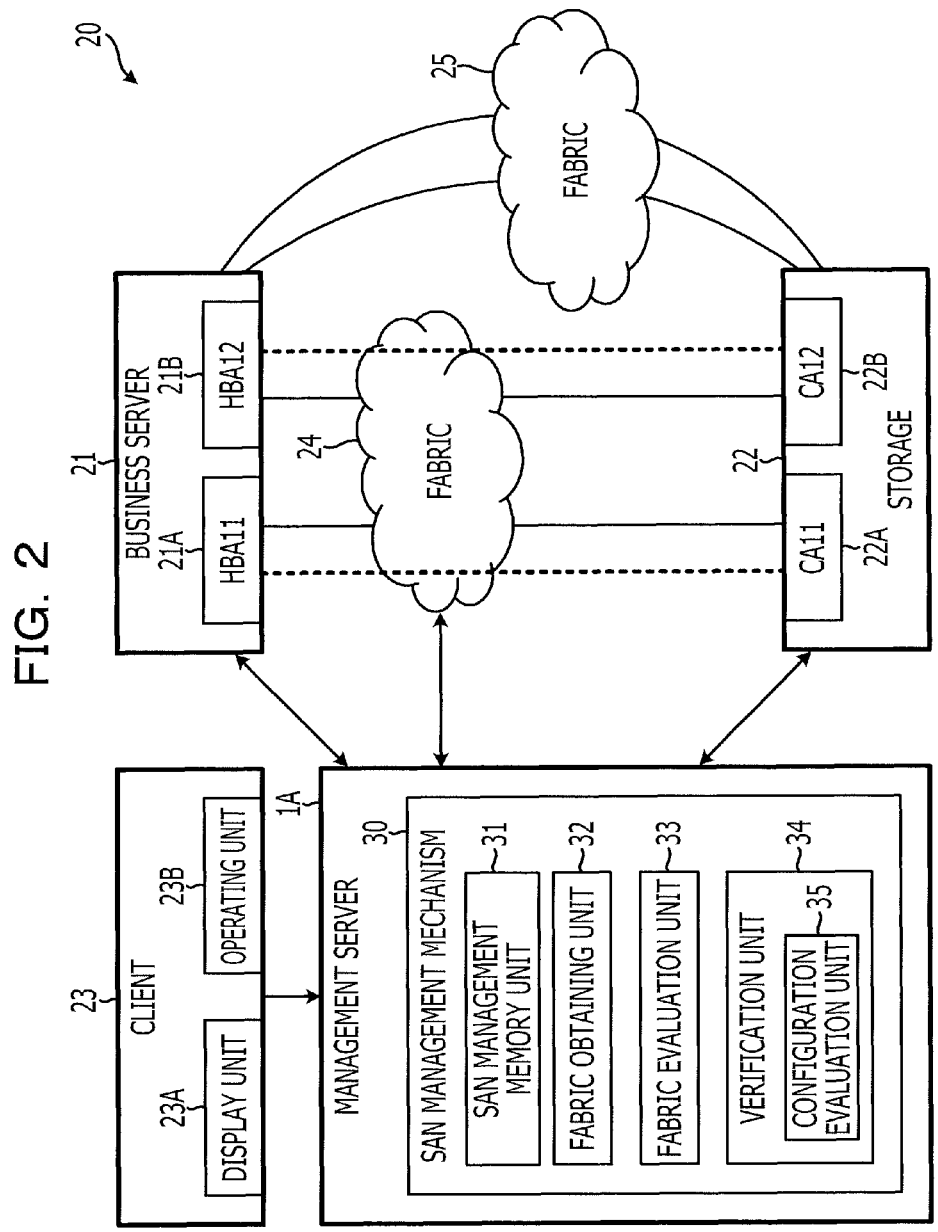
FIG. 2 illustrates the internal configuration of a SAN system according to a second embodiment.

FIG. 2 is a block diagram illustrating a configuration inside a SAN system of a second embodiment. A SAN system 20 illustrated in FIG. 2 has a business server 21, storage 22, a client 23, a fabric 24, a fabric 25, and a management server 1A. A multipath configuration access path is formed through the fabric 24 and the fabric 25 between the business server 21 and the storage 22.

The fabric 24 has at least two or more Fiber Channel Switches (hereinbelow referred to as "FC switches"), and the FC switches are used to form access paths between the business server 21 and the storage 22. The fabric 24 operates like a virtual single FC switch according to the business server 21 and the storage 22 even though multiple FC switches are used in the configuration. The fabric 25 also includes multiple FC switches in the same way as the fabric 24.

Furthermore, each FC switch is provided with a Fabric Element Name as an identifiable ID. Moreover, the fabric 24 and the fabric 25 are each provided with a Fabric Name as an identifiable ID. For example, an FC switch in the fabric 24 may be selected as a representative switch among the switches therein and the Fabric Element Name of the selected FC switch may be used as the Fabric Name.

Figure 3:
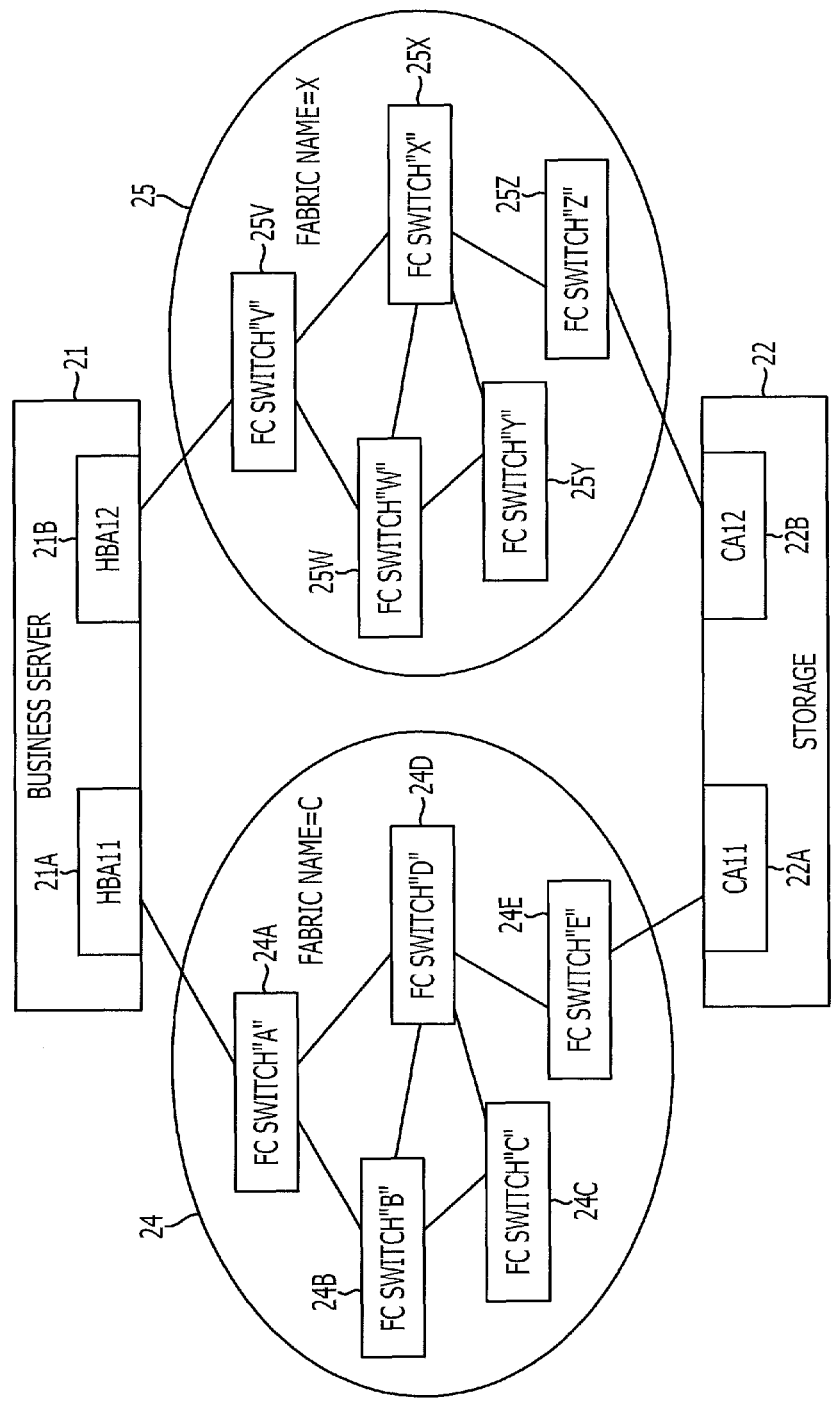
FIG. 3 illustrates an exemplary multipath configuration between a business server and storage.

FIG. 3 illustrates an exemplary multipath configuration between the business server 21 and the storage 22. In the example in FIG. 3, fabric 24 is made up of five FC switches 24A to 24E and fabric 25 is made up of five FC switches 25V to 25Z. Further, the fabric 24 made up of the FC switches 24A to 24E uses the Fabric Element Name "C" as the Fabric Name which is taken from the "C" of the representative FC switch 24C. Further, the fabric 25 made up of the FC switches 25V to 25Z uses the Fabric Element Name "X" as the Fabric Name which is taken from the "X" of the representative FC switch 25X.

The business server 21 has host bus adapters (hereinbelow referred to as "HBA") 21A and 21B that correspond to a port connected to the FC switch 24A in the fabric 24. In the example illustrated in FIG. 3, the business server 21 includes "HBA11" and "HBA12" as HBA 21A and HBA 21B, respectively. Moreover, the storage 22 includes channel adapters (hereinbelow referred to as "CA") 22A and 22B that correspond to a port connected to FC switch 24E in the fabric 24. In the example illustrated in FIG. 3, the storage 22 includes "CA11" and "CA12" as the CA 22A and the CA 22B, respectively. Moreover, the client 23 illustrated in FIG. 2 corresponds to, for example, a computer and has a display unit 23A and an operating unit 23B.

Moreover, the management server 1A has a SAN management mechanism 30 that is configured by SAN management software. Furthermore, the SAN management mechanism 30 has a SAN management memory unit 31, a fabric obtaining unit 32, a fabric evaluation unit 33, and a verification unit 34. The SAN management mechanism 30 communicates with the managed devices in the SAN system 20 such as the business server 21, the storage 22, and the fabrics 24 and 25, and collects information required for SAN management with TCP/IP protocol. Moreover, the SAN management mechanism 30 manages the fabric 24 and the fabric 25 to form access paths between the business server 21 and the storage 22.

FIG. 4 illustrates exemplary contents stored in the SAN management memory unit 31. The SAN management memory unit 31 illustrated in FIG. 4 stores server information 41, switch information 42, storage information 43, and access path information 44. The server information 41 includes HBA information 41A and multipath information 41B corresponding to each of the business servers in the SAN system 20. The HBA information 41A manages HBA identification labels such as "HBA 11" that identify each HBA in the business server 21. The multipath information 41B manages access path identification labels such as "access path 1" that identify each access path in the multipath configuration used by the business server 21. Referring to "server 1" in FIG. 4, the SAN management mechanism 30 can confirm that the "server 1" has "HBA 11" and "HBA 12" for the HBA 21A and HBA 21B respectively, and that the multipath configuration includes "access path 1", "access path 2".

The switch information 42 includes fabric information 42A, switch information 42B, and destination information 42C for each FC switch in the SAN system 20. The fabric information 42A manages the Fabric Name that identifies the fabric 24 or the fabric 25 to which the FC switch belongs. The switch information 42B manages the Fabric Element Name that identifies the applicable FC switch. The destination information 42C manages the destination port names that indicate the ports of, for example, the business server HBA, the storage CA, and other switches. Referring to "switch 1" of the fabric information 42A and the switch information 42B in FIG. 4, the SAN management mechanism 30 can confirm that the "switch 1" includes the fabric "Fabric Name 1" and that the switch is identified as "Fabric Element Name 1". Moreover, by referring to the destination information 42C, the SAN management mechanism 30 can confirm the destinations "HBA11" and "CA11" as the destination port labels of the "switch 1".

The storage information 43 includes CA information 43 for each storage 22 in the SAN system 20. The CA information 43A manages CA identification labels that identify the CAs included in the applicable storage 22. By referring to the CA information 43A of "storage 1" in FIG. 4, the SAN management mechanism 30 can confirm that the "storage 1" includes the "CA11" and the "CA12" as the CA 22A and the CA 22B respectively.

The access path information 44 includes configuration information 44A for each access path in the SAN system 20. The configuration information 44A manages the destination port labels of, for example, the HBA of the business server 21 and the CA of the storage 22 that configure an access path. By referring to "access path 1" in FIG. 4, the SAN management mechanism 30 can confirm the access path between "HBA 11" and "CA 11."

The stored contents of the SAN management memory unit 31 may be setting information based on the setting of an access path by the SAN management mechanism 30, or may be setting information read by the SAN management mechanism 30 from each of the switches, servers, or storages 22 included in the SAN network. Furthermore, the SAN management memory unit 31 may store the storage contents in another format. For example, the storage information 43 may also include multipath information.

The fabric obtaining unit 32 illustrated in FIG. 2 obtains, from the SAN management memory unit 31, the Fabric Names of the fabric 24 and the fabric 25 used by the access paths for each access path if a multipath configuration of access paths exists between the business server 21 and the storage 22. Specifically, the fabric obtaining unit 32 extracts the configuration information 44A related to the access paths in the multipath configuration between the business server 21 and the storage 22, from the SAN management memory unit 31. Further, the fabric obtaining unit 32 extracts the FC switches in the destination information 42C that includes the destination port labels, as well as the HBA and the CA of the extracted configuration information 44A. Then, the fabric obtaining unit 32 collects the Fabric Element Name and the Fabric Name of the extracted FC switches from the SAN management memory unit 31. That is, the fabric obtaining unit 32 obtains the Fabric Names of the fabric 24 and fabric 25 used in the access paths that make up the multipath configuration between the business server 21 and the storage 22.

The fabric evaluation unit 33 evaluates whether or not the Fabric Names, which are obtained by the fabric obtaining unit 32, of the fabrics 24 and 25 used in the access paths of the multipath configuration are the same.

The verification unit 34 determines that the access paths are physically different if the Fabric Names of the fabrics 24 (25) used in the access paths of the multipath configuration between the business server 21 and the storage 22 are not the same since physically different fabrics 24 and 25 exist on the path. As a result, the verification unit 34 determines that there is redundancy in the physical access paths of the multipath configuration since physically different access paths exist. If redundancy exists, a path that guarantees communication can be ensured even when communication is blocked due to the failure of, for example, the FC switch 24A in one path among the multiple paths between the business server 21 and the storage 22, by using the physically different FC switch 25V. Moreover, the verification unit 34 notifies the client 23 about the redundancy determination result concerning the access paths. The client 23 displays the determination result on the display unit 23A.

Moreover, the verification unit 34 includes a configuration evaluation unit 35 that evaluates whether there are two FC switches in the same fabric 24 or 25 when the Fabric Names of the fabric 24 (25) used in the access paths of the multipath configuration between the business server 21 and the storage 22 are the same. The verification unit 34 also evaluates whether or not the access paths of the multipath configuration use the same FC switches according to the destination information 42C when two FC switches exist in the fabric 24 (25).

The following describes a case in which the access paths of the multipath configuration use the same FC switch 24B and do not use the same FC switch 24A with reference to FIG. 5. FIG. 5 illustrates an exemplary multipath configuration using the fabric 24 configured with the two FC switches 24A and 24B. In the example illustrated in FIG. 5, a "business server 1" includes the HBAs 21A and 21B as "HBA 11" and "HBA 12" respectively, and a "business server 2" includes the HBAs 21X and 21Y as "HBA 21" and "HBA 22" respectively. Furthermore, a "storage 1" includes CAs 22A to 22D as "CA11," "CA12," "CA13," and "CA14" respectively.

Two access paths "HBA11" to "CA11" and "HBA12" to "CA13" form a multipath configuration between the "business server 1" and the "storage 1." The access paths between the "business server 1" and the "storage 1" use the same fabric 24 on the path, but it is possible that the access paths in the multipath configuration are not using the same FC switch 24A (24B) since the FC switches 24A and 24B on the path are different. In this case, redundancy exists even if the "FC switch 2" fails since the "FC switch 1" can be used for communication between the "business server 1" and the "storage 1". That is, the verification unit 34 determines that redundancy exists among the physical access paths of the multipath configuration when the access paths of the multipath configuration do not use the same FC switch 24A (24B).

Moreover, two access paths "HBA21" to "CA13" and "HBA22" to "CA14" make up a multipath configuration between a "business server 2" and the "storage 1." The access paths between the "business server 2" and the "storage 1" use the same fabric 24 on the path, but it is possible that the access paths in the multipath configuration are using the same FC switch 24B since the "FC switch 2" is shared. In this case, redundancy does not exist since when the same "FC switch 2" fails, communication between the "business server 2" and the "storage 1" is completely interrupted. That is, the verification unit 34 determines that no redundancy exists among the physical access paths of the multipath configuration if the access paths of the multipath configuration use the same FC switch 24B.

Moreover, the verification unit 34 conducts path searching for each access path to verify redundancy in the physical access paths of the multipath configuration when two FC switches do not exist in the fabric 24 (25) according to the configuration evaluation unit 35.

Figure 6:
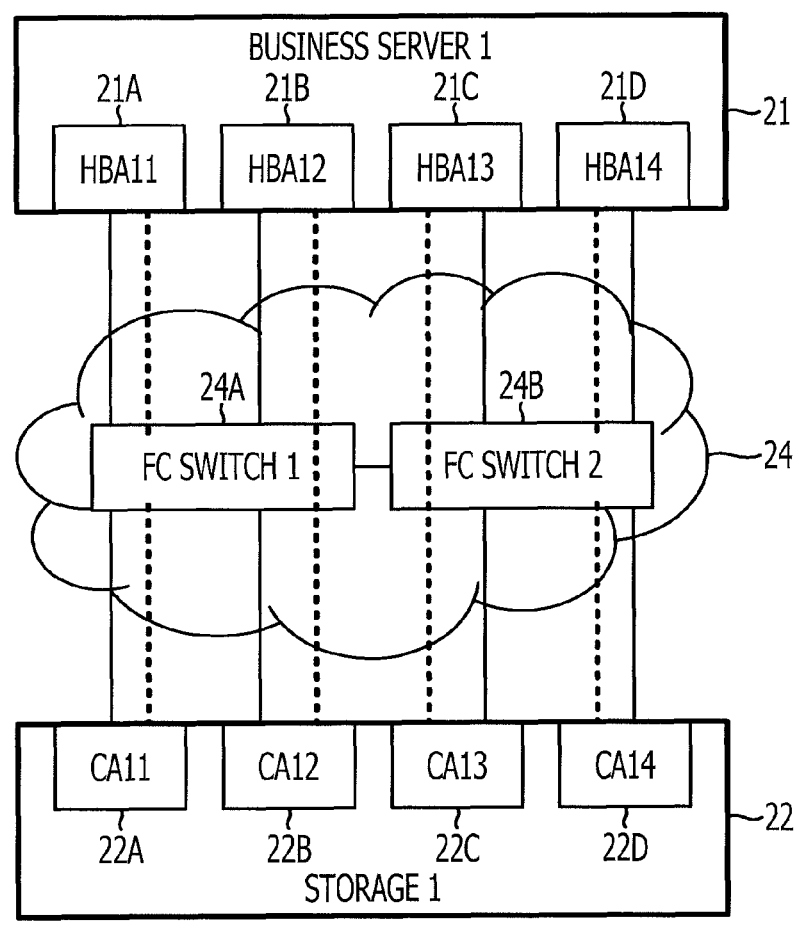
FIG. 6 illustrates an exemplary multipath configuration using a fabric configured with two FC switches.

FIG. 6 illustrates an exemplary multipath configuration using the fabric 24 configured with the two FC switches 24A and 24B. In the example in FIG. 6, the "business server 1" includes "HBA11," "HBA12," "HBA13," and "HBA14" for the four HBAs 21A to 21D. The "storage 1" includes "CA11," "CA12," "CA13," and "CA14" for the four CAs 22A to 22D.

Four access paths "HBA11" to "CA11", "HBA12" to "CA12", "HBA13" to "CA13", and "HBA14" to "CA14" form a multipath configuration between the "business server 1" and the "storage 1." The access paths between the "business server 1" and the "storage 1" are in a state of guaranteed physical redundancy since the FC switches 24A and 24B on the path are different even though the same fabric 24 is used on the path.

The verification unit 34 determines that redundancy in the physical access paths exists and that there is no bias in the multipath configuration when the number of access paths in the multipath configuration between the business server 21 and the storage 22 is a multiple of the number of FC switches. In the example in FIG. 6, the verification unit 34 determines that redundancy in the physical access paths exists and that there is no bias in the multipath configuration since the number of access paths in the multipath configuration between the business server 21 and the storage 22 is four which is a multiple of the number of FC switches which is two.

Figure 7:
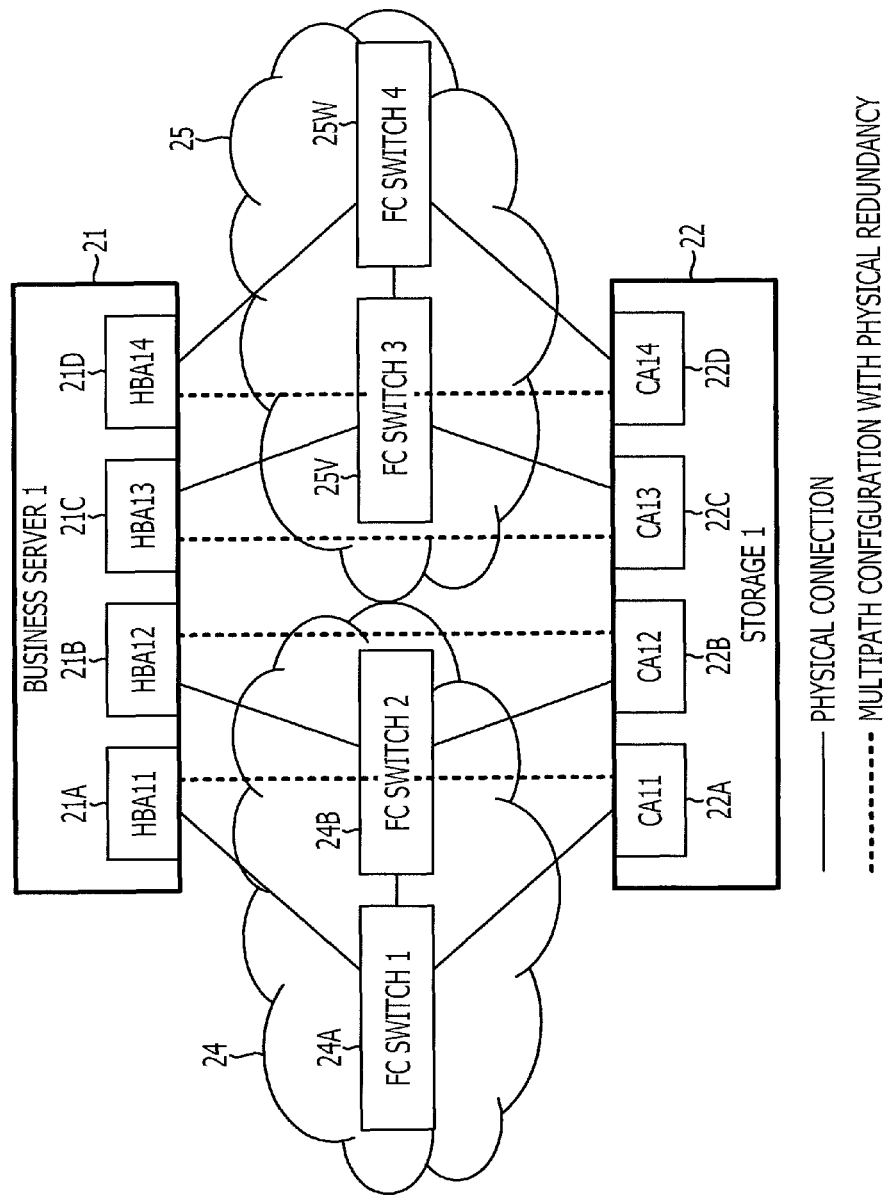
FIG. 7 illustrates an exemplary multipath configuration using two fabrics.

FIG. 7 illustrates an exemplary multipath configuration using the two fabrics 24 and 25. In the example in FIG. 7, the "business server 1" includes "HBA11," "HBA12," "HBA13," and "HBA14" for the four HBAs 21A to 21D. The "storage 1" includes "CA11," "CA12," "CA13," and "CA14" for the four CAs 22A to 22D.

Four access paths "HBA11" to "CA11", "HBA12" to "CA12", "HBA13" to "CA13", and "HBA14" to "CA14" form a multipath configuration between the "business server 1" and the "storage 1." The access paths between the "business server 1" and the "storage 1" are in a state of guaranteed physical redundancy since the FC switches 24A and 24B (25V and 25W) and the fabric 24 (25) on the path differ from each other.

The verification unit 34 determines that redundancy in the physical access paths exists and that there is no bias in the multipath configuration when the number of access paths in the multipath configuration between the business server 21 and the storage 22 is a multiple of the number of fabrics. In the example in FIG. 7, the verification unit 34 determines that redundancy in the physical access paths exists and that there is no bias in the multipath configuration since the number of access paths in the multipath configuration between the business server 21 and the storage 22 is four which is a multiple of the number of fabrics which is two.

Figure 8:
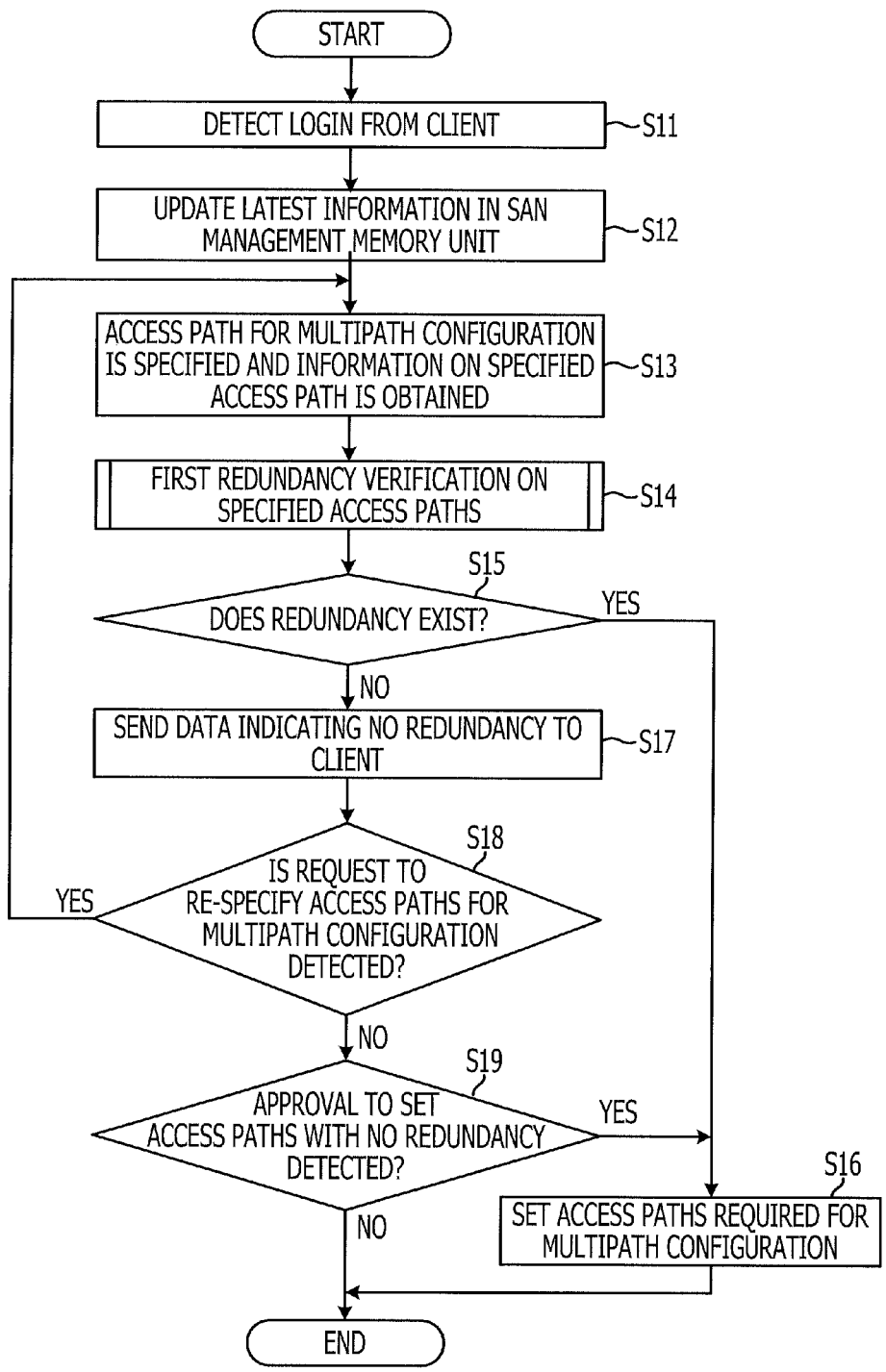
FIG. 8 is a flow chart illustrating processing by a SAN management device involved in access path setting processing.

The following explains operations of the SAN system 20 according to a second embodiment. FIG. 8 is a flow chart illustrating processing by the SAN management device 30 involved in access path setting processing. The access path setting procedures illustrated in FIG. 8 are user operated procedures for setting required access paths in a multipath configuration between the business server 21 and the storage 22. The SAN management mechanism 30 illustrated in FIG. 8 detects a login from the client 23 side (S11), communicates with the business server 21, the fabrics 24 and 25, and the storage 22 to collect the latest information, and updates the SAN management memory unit 31 using the latest information (S12). The latest information refers to the latest information among the server information 41, the switch information 42, the storage information 43, and the access path information 44.

The SAN management mechanism 30 obtains configuration information on access paths (access path information) required for the multipath configuration and specified by specifying operations by the client 23 side (S13). The user specifies, for example, "HBA11" and "CA11" as destination port labels that make up the access paths, on the display screen of the display unit 23A of the client 23.

The verification unit 34 of the SAN management mechanism 30 conducts a below-mentioned first redundancy verification to verify the redundancy in the specified access paths (S14). After conducting the first redundancy verification, the verification unit 34 determines whether or not redundancy in the physical access paths exists based on the result of the first redundancy verification (S15). If redundancy in the physical access paths of the multipath configuration is determined to exist (S15 Yes), the SAN management mechanism 30 communicates with the business server 21, the fabrics 24 and 25, and the storage 22 to set the access paths required for the multipath configuration (S16). Then the procedures in FIG. 8 are completed.

If no redundancy in the physical access paths of the multipath configuration exists (S15 No), the verification unit 34 sends a message indicating that no redundancy exists to the client 23 (S17). The client 23 displays the "no redundancy exists" message on the display screen of the display unit 23A. As a result, the user looks at the display screen and is made aware that there is no redundancy in the specified access paths in the multipath configuration.

Furthermore, after sending the message that no redundancy exists to the client 23, the verification unit 34 determines whether or not a request to re-specify access paths that make up the multipath configuration from the client 23 has been detected (S18). If an access path re-specification request has been detected (S18 Yes), the SAN management mechanism 30 returns to step S13 for re-specification of the access paths required for the multipath configuration.

If no access path re-specification request has been detected (S18 No), the SAN management mechanism 30 determines whether or not approval is detected to set the access paths required for the multipath configuration without redundancy in the physical access paths (S19).

If approval to set the access paths required for the multipath configuration without redundancy in the physical access paths is detected (S19 Yes), the SAN management mechanism 30 switches to step S16 to communicate with the business server 21, the fabrics 24 and 25, and the storage 22 to set the required access paths of the multipath configuration. However, if approval to set the access paths required for the multipath configuration without redundancy in the physical access paths is not detected (S19 No), the procedures illustrated in FIG. 8 are completed.

In the access path setting procedures illustrated in FIG. 8, access paths required for the multipath configuration are specified by the user, physical redundancy in the specified access paths is verified, and the specified access paths are set as the multipath configuration access paths if redundancy exists. As a result, the user can set multipath configuration access paths with guaranteed physical redundancy.

The access path setting procedures include verifying the physical redundancy in the specified access paths and sending a message to the client 23 indicating that redundancy does not exist for the applicable access paths when there is no redundancy. As a result, the user can be informed about the lack of redundancy in the specified access paths based on the no redundancy message.

When there is no physical redundancy in the specified access paths in the access path setting procedures, access paths without redundancy can be set according to the setting operations.

Figure 9:
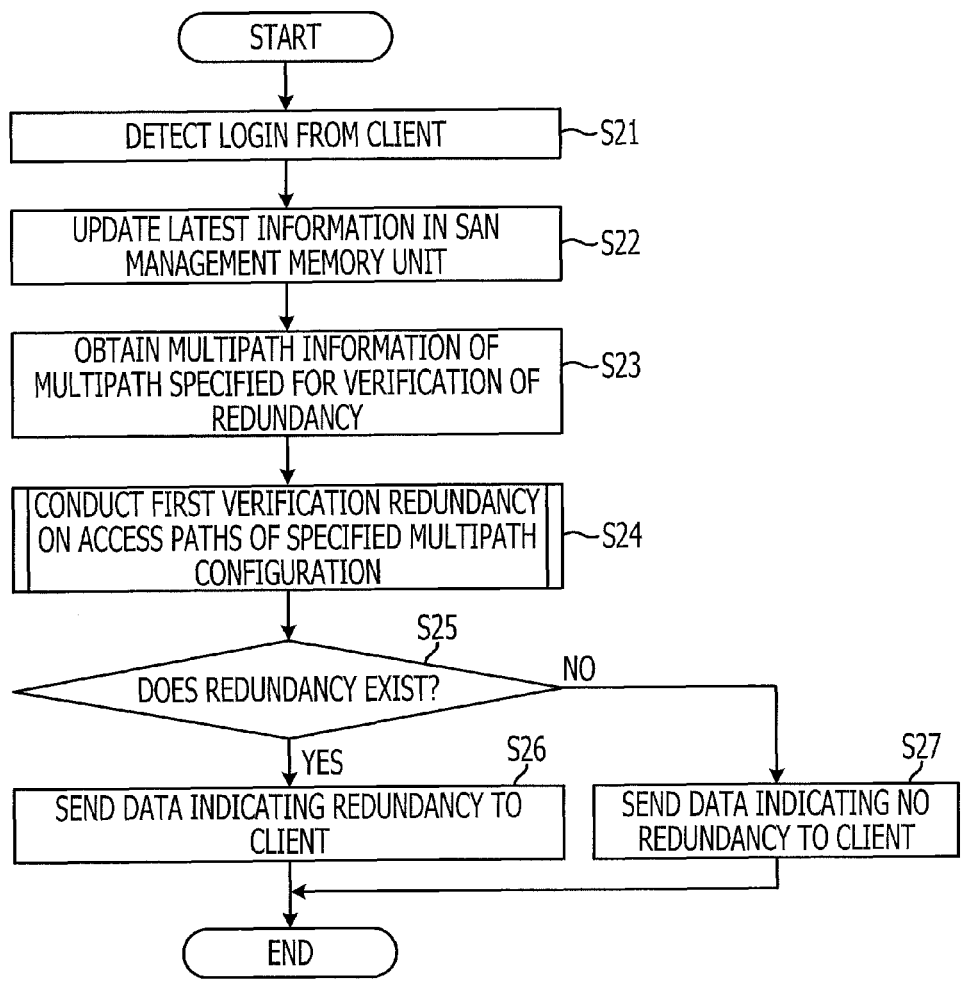
FIG. 9 is a flow chart illustrating processing by a SAN management mechanism involved in multipath redundancy verification procedures.

FIG. 9 is a flow chart illustrating processing by the SAN management mechanism 30 involved in multipath redundancy verification procedures. The multipath redundancy verification procedures illustrated in FIG. 9 are procedures for specifying a required multipath configuration among configured multipath configurations and for verifying redundancy in the physical access paths of the specified multipath configuration.

The SAN management mechanism 30 illustrated in FIG. 9 detects a login performed by a user from the client 23 (S21). The SAN management mechanism 30 illustrated in FIG. 9 communicates with the business server 21, the fabrics 24 and 25, and the storage 22 to collect the latest information, and updates the SAN management memory unit 31 using the latest information (S22). The SAN management mechanism 30 obtains multipath information on the multipath configuration specified for redundancy verification from among the information of the multipath configurations set by the user from the client 23 (S23). The user specifies the information of the multipath configuration to be subjected to redundancy verification on the display screen of the display unit 23A of the client 23.

The verification unit 34 conducts the below-mentioned first redundancy verification on the specified multipath information (S24). After conducting the first redundancy verification, the verification unit 34 determines whether or not redundancy in the physical access paths exists based on the result of the first redundancy verification (S25). If redundancy in the physical access paths exists (S25 Yes), the verification unit 34 sends a message indicating that redundancy in the physical access paths of the multipath configuration exists to the client 23 (S26), and then the procedures illustrated in FIG. 9 are completed. The client 23 displays the message indicating that redundancy in the physical access paths of the multipath configuration exists on the display screen of the display unit 23A. As a result, the user looks at the display screen and is made aware that physical redundancy exists in the specified access paths in the multipath configuration.

If no redundancy in the physical access paths exists (S25 No), the verification unit 34 sends a message indicating that redundancy in the physical access paths of the multipath configuration does not exist to the client 23 (S27), and then the procedures illustrated in FIG. 9 are completed. The client 23 displays the message indicating that redundancy in the physical access paths of the currently specified multipath configuration does not exist on the display screen of the display unit 23A. As a result, the user looks at the display screen and is made aware that physical redundancy does not exist in the specified access paths in the specified multipath configuration.

The multipath redundancy verification procedures illustrated in FIG. 9 are procedures for verifying redundancy in the physical access paths of the multipath configuration specified for redundancy verification among multipath configurations configured by the user. As a result, the user specifies the configured multipath information to confirm the redundancy in the access paths of the specified multipath configuration.

The multipath redundancy verification procedures include verifying redundancy in the physical access paths of the specified multipath configuration and sending a message indicating redundancy to the client 23 when redundancy exists. As a result, the user can be made aware of the redundancy in the physical access paths of the specified multipath configuration based on the message indicating that redundancy exists.

The multipath redundancy verification procedures include verifying redundancy in the physical access paths of the specified multipath configuration and sending a message indicating no redundancy to the client 23 when redundancy does not exist. As a result, the user can be made aware that no redundancy in the physical access paths of the specified multipath configuration exists based on the message indicating that redundancy does not exist.

Figure 10:
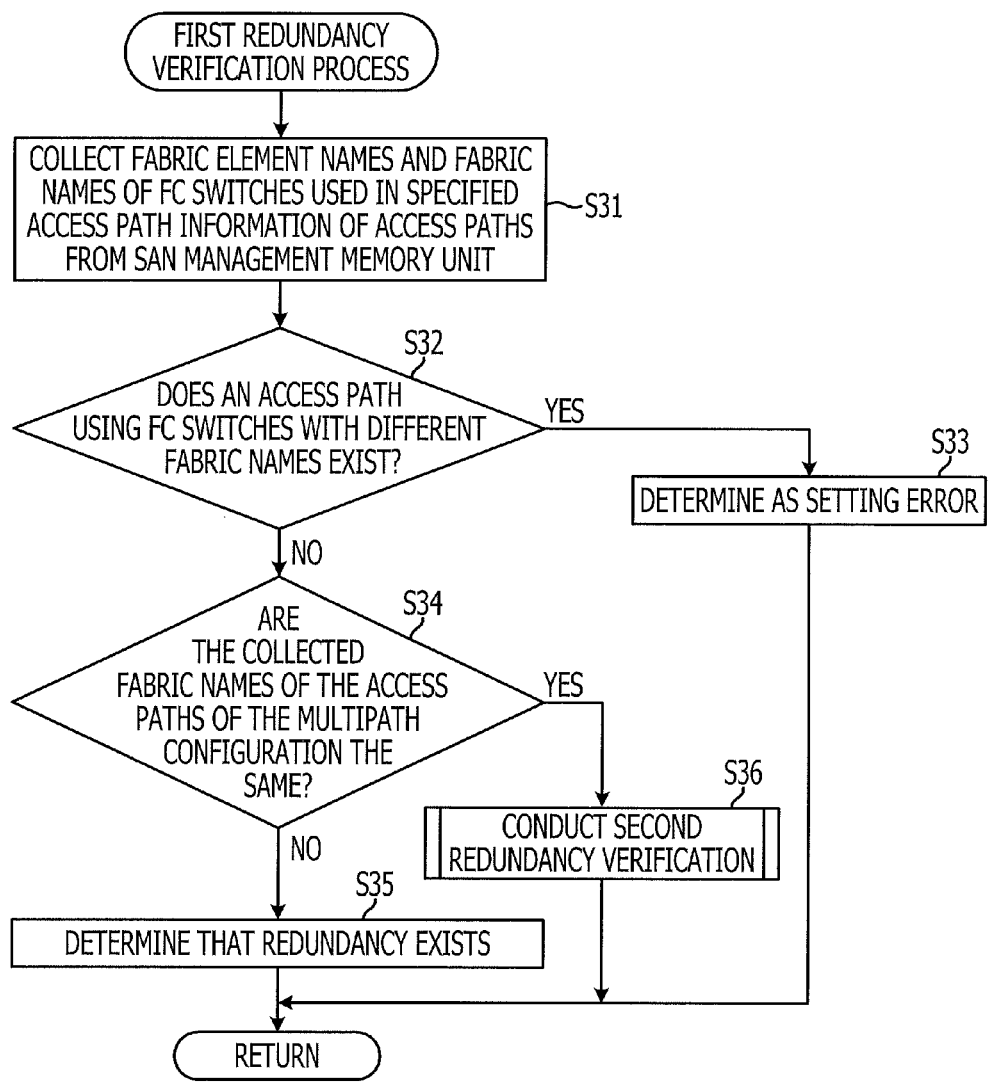
FIG. 10 is a flow chart illustrating processing by a SAN management device involved in first redundancy verification processing.

FIG. 10 is a flow chart illustrating processing by the SAN management mechanism 30 involved in first redundancy verification processing. The first redundancy verification procedure illustrated in FIG. 10 is a procedure to verify redundancy in physical access paths of the multipath configuration related to specified access path information.

The fabric obtaining unit 32 of the SAN management mechanism 30 indicated in FIG. 10 extracts the configuration information 44A related to the multipath configuration access path information obtained in step S13 in FIG. 8 or step S23 in FIG. 9, from the SAN management memory unit 31 (S31). Further, the fabric obtaining unit 32 extracts the FC switches in the destination information 42C that includes the destination port labels, the HBAs and the CAs of the extracted configuration information 44A (S31). Then, the fabric obtaining unit 32 collects the Fabric Element Names and the Fabric Names of the extracted FC switches from the SAN management memory unit 31 (S31). The verification unit 34 determines on the basis of the result of step S31 whether or not the access paths use FC switches with different Fabric Names (S32).

Although not specifically illustrated, for example, an access path between "HBA12" and "CA13" in FIG. 7 may be assumed as an access path using FC switches with different Fabric Names. For example, the access path uses FC switches with different Fabric Names such that "HBA 12" uses the "FC switch 2" of the "fabric 1" and "CA 13" uses the "FC switch 3" of the "fabric 2."

If there is an access path using FC switches with different Fabric Names (S32 Yes), the verification unit 34 determines that there is a setting error and warns the user that the physical configuration uses FC switches with different Fabric Names in the same path (S33). Then the procedures in FIG. 10 are completed. The verification unit 34 notifies the client 23 about the setting error. The client 23 displays the setting error on the display screen of the display unit 23A. As a result, the user can be made aware that there is a setting error in the specified access path.

If there is no access path using FC switches with different Fabric Names (S32 No), the fabric evaluation unit 33 evaluates whether or not the Fabric Names of the fabric 24 (or 25) used in the access paths and collected in step S31 are the same (S34). If the Fabric Names of the fabric 24 (or 25) used in the access paths are not the same (S34 No), the verification unit 34 determines that redundancy in the physical access paths exists in the multipath configuration (S35) since physically different fabrics 24 (or 25) exist. Then the procedures in FIG. 10 are completed.

If the Fabric Names of the fabric 24 (or 25) used in the access paths are the same (S34 Yes), the verification unit 34 executes a below-mentioned second redundancy verification process since there are no physically different fabrics 24 (or 25) (S36).

The first redundancy verification process illustrated in FIG. 10 includes collecting the Fabric Names of the FC switches used in the access paths of the multipath configuration and then determining that there is a setting error if there is an access path using FC switches with different Fabric Names in a single path. As a result, the user can be made aware that there is a setting error in the specified access path.

In the first redundancy verification process, redundancy in the physical access paths in the multipath configuration is determined to exist if the Fabric Names of the fabric 24 (or 25) used in the access paths of the multipath configuration are not the same. As a result, the processing load to verify redundancy can be decreased since redundancy is verified based on the Fabric Names of the fabric 24 (or 25) used in the physical access paths of the multipath configuration. Moreover, the time needed to conduct such verification can be reduced due to the reduction in the processing load for verification.

Figure 11:
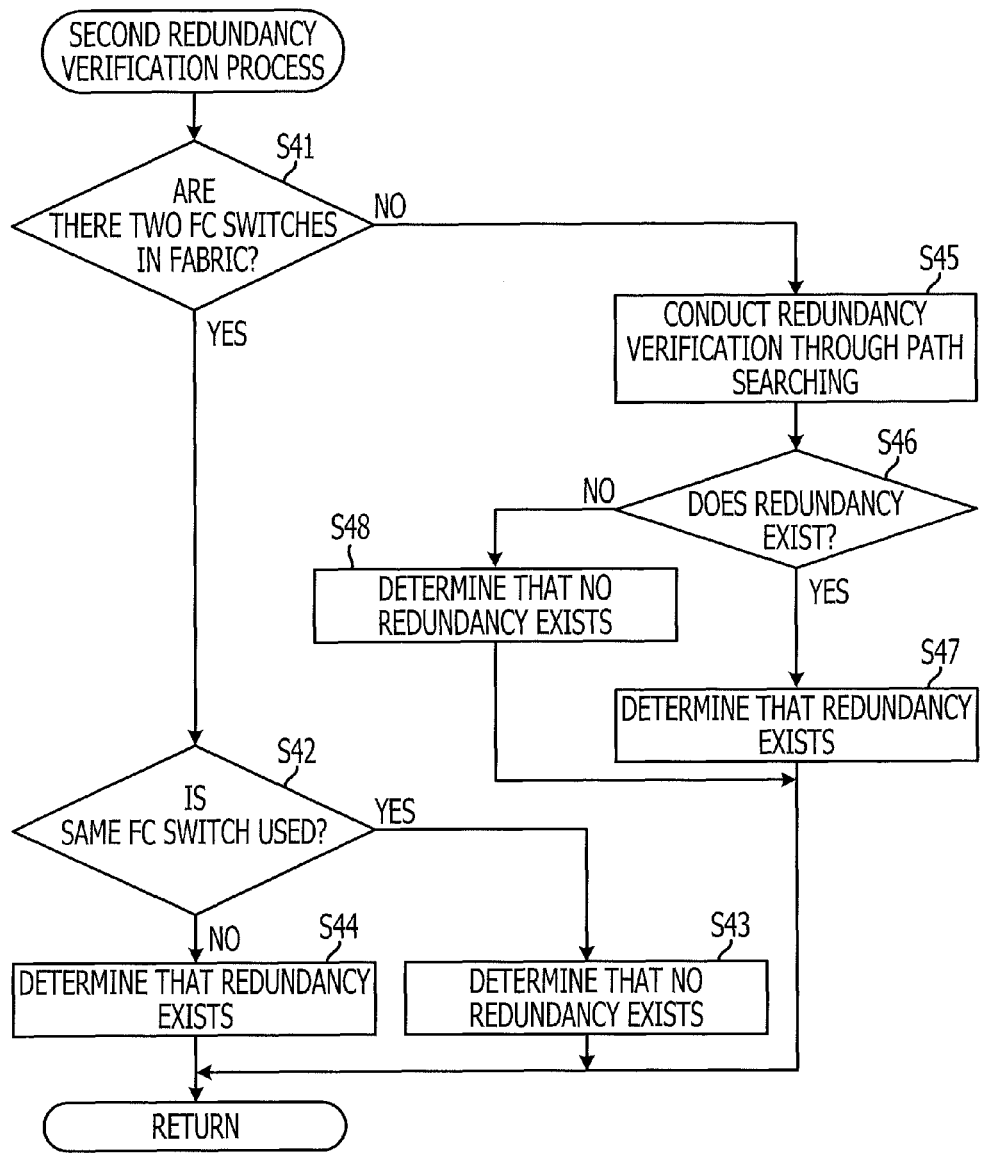
FIG. 11 is a flow chart illustrating processing by a SAN management device involved in second redundancy verification processing.

FIG. 11 is a flow chart illustrating processing by the SAN management mechanism 30 involved in second redundancy verification processing. In the second redundancy verification process illustrated in FIG. 11, redundancy in the physical access paths in the multipath configuration is verified even if the collected Fabric Names of the fabric 24 (or 25) used in the access paths of the multipath configuration are the same.

The configuration evaluation unit 35 of the verification unit 34 in FIG. 11 evaluates whether or not there are two FC switches in the fabric 24 (or 25) even when the Fabric Name of the fabric 24 (or 25) used in the access paths of the multipath configuration is the same (S41). When two FC switches exist (S41 Yes) in the fabric 24 (or 25), the verification unit 34 evaluates whether or not all of the access paths of the multipath configuration use the same FC switch based on the destination information 42C (S42).

If all the access paths in the multipath configuration use the same FC switch (S42 Yes), the verification unit 34 determines that there is no redundancy in the physical access paths since the same FC switch is shared on the path (S43). Then the procedures in FIG. 11 are completed.

Further, if all the access paths in the multipath configuration do not use the same FC switch (S42 No), the verification unit 34 determines that other FC switches are being used in the access paths. As a result, the verification unit 34 determines that redundancy exists in the physical access paths (S44) and the procedures in FIG. 11 are completed.

Moreover, if more or less than two FC switches exist in the fabric 24 (or 25) (S41 No), the verification unit 34 conducts a verification of the redundancy in the physical access paths by path searching (S45). After conducting the redundancy verification by path searching, the verification unit 34 determines whether or not redundancy in the physical access paths in the multipath configuration exists (S46).

If redundancy in the physical access paths of the multipath configuration is found (S46 Yes), the verification unit 34 determines that redundancy in the physical access paths exists (S47), and then the procedures illustrated in FIG. 11 are completed. If no redundancy in the physical access paths is found (S46 No), the verification unit 34 determines that there is no redundancy in the physical access paths (S48) and then the procedures illustrated in FIG. 11 are completed.

The second redundancy verification procedures illustrated in FIG. 11 include determining whether or not two FC switches exist in the fabric 24 (or 25) even when the Fabric Names of the FC switches used in the access paths of the multipath configuration are the same. Moreover, when two FC switches exist and the same FC switches are used in the access paths of the multipath configuration, redundancy in the physical access paths of the multipath configuration is determined to not exist. As a result, the time needed to conduct such verification can be reduced due to the reduction in the processing load needed for redundancy verification.

The second redundancy verification procedure includes determining that redundancy in the physical access paths of the multipath configuration does exist when the FC switches in the access paths of the multipath configuration are not the same even when there are two FC switches in the fabric 24 (or 25). As a result, redundancy in the physical access paths can be determined since different FC switches can be used on the path even when the same fabric 24 (or 25) is used.

The second redundancy verification procedure includes verifying redundancy in the physical access paths in the multipath configuration by path searching when more or less than two FC switches, for example three or more, exist in the fabric 24 (or 25). As a result, verification of the redundancy in the physical access paths of the multipath configuration can be attempted even when verification of redundancy cannot be verified using the Fabric Names of the fabric 24 (or 25).

In the second embodiment, the Fabric Names of the fabric 24 (or 25) used in the applicable access paths can be obtained for each access path when there are multiple access paths between the business server 21 and the storage 22. Moreover, in the second embodiment, whether the obtained Fabric Names of the fabric 24 (or 25) used in the access paths are the same or not can be determined and hence the access paths between the business server 21 and the storage 22 can be verified based on the result of the determination. As a result, the processing load to verify redundancy can be decreased since redundancy in the physical access paths of the multipath configuration is verified based on the Fabric Names of the fabric 24 (or 25) used in the physical access paths of the multipath configuration. Moreover, the time needed to conduct such verification can be reduced due to the reduction in the processing load needed for redundancy verification.

In the second embodiment, redundancy in the physical access paths in the multipath configuration is determined to exist if the Fabric Names of the fabric 24 (or 25) used in the access paths of the multipath configuration are not the same. As a result, verification time can be shortened due to the reduction in the processing load of the redundancy verification.

In the second embodiment, redundancy in the physical access paths is determined to not exist when the Fabric Names of the fabric 24 (or 25) used in the access paths of the multipath configuration are the same, two FC switches exist in the fabric 24 (or 25), and each access path uses the same FC switch. As a result, verification time can be shortened due to the reduction in the processing load of the redundancy verification.

In the second embodiment, redundancy in the physical access paths is determined to exist when the Fabric Names of the fabric 24 (or 25) used in the access paths of the multipath configuration are the same, two FC switches exist in the fabric 24 (or 25), and the access paths do not use the same FC switch. As a result, redundancy in the physical access paths can be determined since different FC switches can be used on the path even when the same fabric 24 (or 25) is used.

Moreover, in the second embodiment, redundancy in the physical access paths is verified through path searching when the Fabric Names of the fabric 24 (or 25) used in the access paths of the multipath configuration are the same, and more or less than two FC switches exist in the fabric 24 (or 25). As a result, verification of the redundancy in the physical access paths of the multipath configuration can be attempted even when verification of redundancy cannot be verified using the Fabric Names of the fabric 24 (or 25).

Furthermore, the second embodiment includes collecting the Fabric Names of the FC switches used in the access paths of the multipath configuration and then determining that there is a setting error if there is an access path using FC switches with different Fabric Names in a single path. As a result, the user can be made aware that there is a setting error in the specified access path.

In the above embodiments, although redundancy is verified through a path searching procedure when more than two FC switches exist in the fabric 24 (or 25) in step S41 in FIG. 11, other redundancy verification methods may be used.

The constituent elements of the illustrated parts do not need to be configured physically as illustrated. In other words, the embodiments are not limited to the particular forms of distribution and integration of each part and all or some of the parts may be configured to be functionally or physically distributed or integrated in arbitrary units according to the type of load or usage conditions and the like.

Furthermore, various processing functions conducted by the devices may be executed in part or in total on a CPU (Central Processing Unit) (or a micro computer such as an MPU (Micro Processing Unit) or an MCU (Micro Controller Unit) and the like). Moreover, various processing functions may also be conducted in part or in total on a program that conducts analysis with the CPU (or a micro computer such as an MPU or MCU), or on hardwire based on wired logic.

Figure 12:
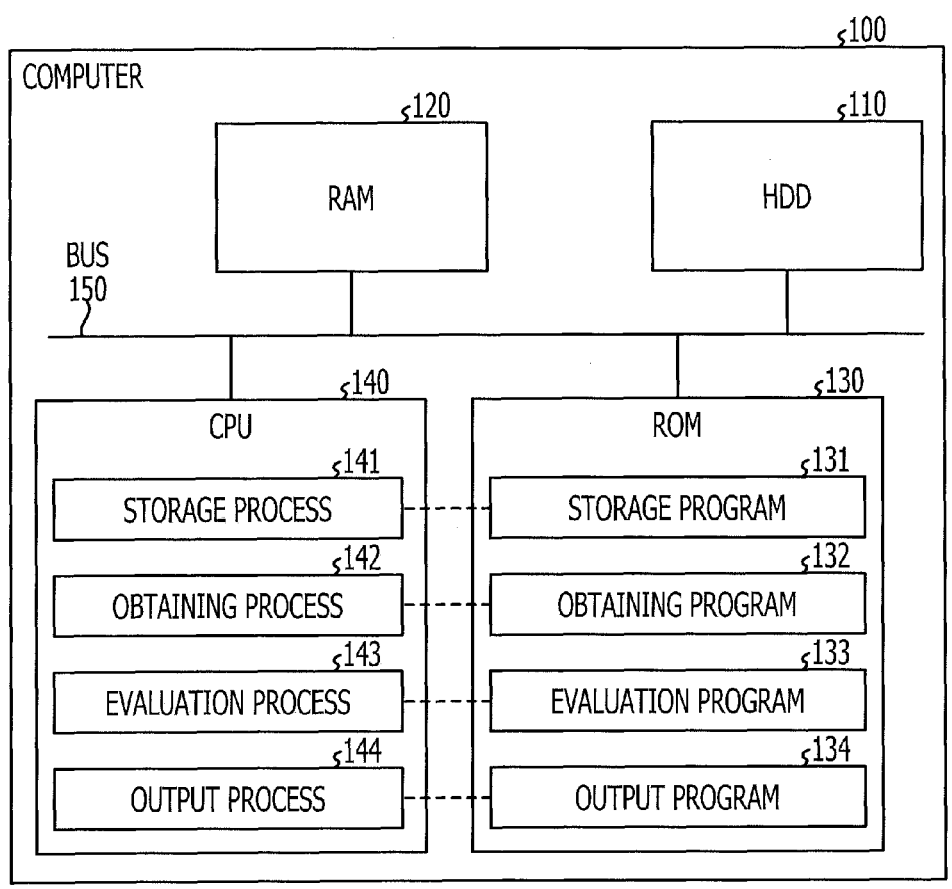
FIG. 12 illustrates a computer that executes a communication path verification program.

The various procedures described in the embodiments may be performed by executing previously prepared programs on a computer. In the following description, an example of a computer executing a program that has functions similar to the above embodiments will be illustrated using FIG. 12. FIG. 12 illustrates a computer that executes communication path verification programs.

As illustrated in FIG. 12, a computer 100 running communication path verification programs is configured to connect an HDD (Hard Disk Drive) 110, a RAM (Random Access Memory) 120, a ROM (Read Only Memory) 130, and a CPU 140 through a bus 150.

The ROM 130 is pre-recorded with communication path verification programs including a storage program 131, an obtaining program 132, an evaluation program 133, and an output program 134 as illustrated in FIG. 12, and these programs demonstrate similar functions to the above embodiments. The programs 131 to 134 may be integrated or distributed appropriately in the same way as the constituent elements of the communication path verification device 1 illustrated in FIG. 1.

The programs 131 to 134 are read from the ROM 130 and executed by the CPU 140 so that the programs 131 to 134 function as a storage process 141, an obtaining process 142, an evaluation process 143, and an output process 144, respectively, as illustrated in FIG. 12. The processes 141 to 144 function respectively as the storage unit 11, the obtaining unit 12, the evaluating unit 13, and the output unit 14 in the same way as the constituent elements of the communication path verification device 1 illustrated in FIG. 1.

The CPU 140 stores the cluster IDs that identify switch clusters that contain the switches used in the communication paths between the first device and the second device, in the RAM 120 for each communication path. The CPU 140 obtains the cluster IDs of the switch clusters corresponding to the applicable communication paths for each communication path between the first device and the second device when there are multiple communication paths between the first device and the second device. The CPU 140 determines whether or not the obtained cluster IDs of the communication paths are the same. The CPU 140 outputs the result of the determination of whether or not the obtained cluster IDs of the communication paths are the same. As a result, redundantly arranged communication paths between the first device 2 and the second device 3 can be confirmed without conducting path searching of the multiple communication paths. As a result, the processing load needed for verifying redundancy can be reduced. Moreover, the time needed to conduct such verification can be shortened due to the reduction in the processing load needed for verification.

The processing load for verifying communication paths can be reduced in one aspect of the present embodiments.

A program/software implementing the embodiments may be recorded on computer-readable recording medium. The program/software implementing the embodiments may also be transmitted over transmission communication medium. Examples of a computer-readable recording medium include a magnetic recording apparatus, an optical disk, a magneto-optical disk, and/or a semiconductor memory (for example, RAM, ROM, etc.). Examples of a magnetic recording apparatus include a hard disk device (HDD), a flexible disk (FD), and a magnetic tape (MT). Examples of a optical disk include a DVD (Digital Versatile Disc), a DVD-RAM, a CD-ROM (Compact Disc-Read Only Memory), and a CD-R (Recordable)/RW.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A verification method that is used in a system in which a first device and a second device communicate using a physical communication path that includes at least one switch among switches included in a plurality of switch clusters and does not include a plurality of switches that belong to a different switch cluster among the plurality of switch clusters, the verification method comprising:
   verifying, by a computer, whether switches included in a first communication path and a second communication path that are communication paths used for communication between the first device and the second device are included in a same switch cluster by comparing cluster identification information for switches on at least the first communication path with cluster identification information for switches on the second communication path; and
   producing identification of whether respective switches compared are in the same switch cluster based on the verifying.

2. The verification method according to claim 1,
   wherein the verifying uses cluster identification information which identifies a switch cluster including at least one switch used by a respective communication path, to verify whether the same switch cluster is used on different communication paths, and
   the verifying includes comparing cluster identification information for switches on a first communication path with cluster identification information for switches on a second communication path to determine when the same switch cluster exists.

3. The verification method according to claim 2,
   wherein when the same switch cluster is used by the first communication path and the second communication path, the verifying verifies the same switch cluster to identify whether there are multiple switches in the same switch cluster, and whether the first communication path and the second communication are configured to transmit data to different switches in the same switch cluster.

4. The verification method according to claim 2, comprising:
   indicating a presence of redundancy in physical communication paths between the first device and the second device when a result of the verifying indicates no match between the cluster identification information associated with a first port in the first device and the cluster identification information associated with a second port in the first device.

5. The verification method according to claim 2, comprising:
   indicating a presence of redundancy in physical communication paths between the first device and the second device when the identification indicates:
      a match between the cluster identification information associated with a first port in the first and the cluster identification information associated with a second port in the first,
      there are at least two matching switches in a same switch cluster, and
      the first port and the second port are configured to transmit data to different switches in the same switch cluster.

6. The verification method according to claim 2, comprising:
   obtaining identification information that identifies a first port provided in the second device accommodating a communication path connected with a second port in the first device, and
   outputting a communication path setting error when cluster identification information for a switch corresponding with the first port does not match the cluster identification information associated with the second port.

7. A non-transitory computer readable medium storing an evaluation program that causes a computer to execute a process comprising:
storing, in a storage, first identification information identifying a destination port of each port provided in switches, a switch associated with the destination port and cluster identification information that identifies a switch cluster associated with the switch;
obtaining second identification information that identifies both a first port and a second port that are ports provided in a first device along a communication path used for communication with a second device;
determining whether cluster identification information for a switch corresponding with the first port matches cluster identification information for a switch corresponding with the second port, to thereby produce an evaluation result including identification of whether respective switches compared are in a same switch cluster; and
outputting the evaluation result.

8. The non-transitory computer readable medium according to claim 7, wherein the process comprising:
indicating a presence of redundancy in physical paths between the first device and the second device when the evaluation result indicates no match between the cluster identification information associated with the first port and the cluster identification information associated with the second port.

9. The non-transitory computer readable medium according to claim 7, wherein the process comprising:
indicating a presence of redundancy in physical paths between the first device and the second device when the evaluation result indicates:
a match between the cluster identification information associated with the first port and the cluster identification information associated with the second port,
there are at least two matching switches in a same switch cluster, and
the first port and the second port are configured to transmit data to different switches in the same switch cluster.

10. The non-transitory computer readable medium according to claim 7 wherein the process comprising:
conducting a path searching process on physical communication paths between the first device and the second device, and conducting redundancy verification of the physical communication paths between the first device and the second device when a presence of redundancy is not indicated.

11. The non-transitory computer readable medium according to claim 7, wherein the process comprising:
obtaining third identification information that identifies a third port that is a port provided in the second device accommodating a communication path connected with the first port, and
outputting a communication path setting error when cluster identification information for a switch corresponding with the third port does not match the cluster identification information associated with the first port.

12. A non-transitory computer readable medium storing an evaluation program that causes a computer to execute a process comprising:
determining whether switches in a first communication path and a second communication path between a first device and a second device are included in a same switch cluster of a plurality of switch clusters by comparing cluster identification information for switches on at least the first communication path with cluster identification information for switches on the second communication path, to thereby produce an evaluation result including identification of whether respective switches compared are in the same switch cluster; and
outputting the evaluation result.

13. The non-transitory computer readable medium according to claim 12, wherein when the same switch cluster is used by the first communication path and the second communication path, the evaluating further evaluates the same switch cluster to identify whether there are multiple switches in the same switch cluster, and whether the first communication path and the second communication are configured to transmit data to different switches in the same switch cluster.

14. The non-transitory computer readable medium according to claim 13,
wherein the evaluation result selectively changes based on data evaluated in the evaluating.

15. The non-transitory computer readable medium according to claim 12, wherein the evaluating compares cluster identification information across a plurality of communication paths.

16. A verification device that is used in a system in which a first device and a second device communicate using a physical communication path that includes at least one switch among switches included in a plurality of switch clusters and does not include a plurality of switches that belong to a different switch cluster among the plurality of switch clusters, the verification device comprising:
a processor coupled to a memory, configured to:
verify whether switches included in a first communication path and a second communication path that are communication paths used for communication between the first device and the second device are included in a same switch cluster by comparing cluster identification information for switches on at least the first communication path with cluster identification information for switches on the second communication path, and thereby produce a verification result including identification of whether respective switches compared are in the same switch cluster; and
output the verification result.

17. A verification device comprising: a communication interface which obtains information identifying a destination of each port of each device included in a system in which a first device and a second device communicate through any of a plurality of switch clusters; and
a processor which verifies, using the obtained information indicating the destination, whether switches included in each of a first communication path and a second communication path that are communication paths used for communication between a first device and a second device, are included in a same switch cluster by comparing cluster identification information for switches on at least the first communication path with cluster identification information for switches on the second communication path and issues identification as to whether respective switches compared are in the same switch cluster.

18. A verification device in a system that includes a first device, a second device, and a plurality of switch clusters, the verification device comprising:
a memory that stores port identification information identifying a destination port for ports provided in a switch corresponding with a switch cluster, where the port identification information is associated with cluster identification information which identifies the switch cluster of the plurality of switch clusters;

a communication interface that obtains the port identification information identifying a first port and a second port that are ports provided in the first device accommodating a communication path used for communication with the second device; and a processor configured to determine whether the cluster identification information for a switch corresponding with the first port matches with cluster identification information for a switch corresponding with the second port by comparing cluster identification for a switch associated with the first port and cluster identification information for a switch associated with the second port and producing an evaluation result including identification of whether respective switches compared correspond with the same cluster identification information.

* * * * *